Dec. 15, 1970    J. B. GARDNER    3,548,211
ROTATING RADIATION SENSOR
Filed Feb. 27, 1968    3 Sheets-Sheet 1

James B. Gardner
INVENTOR.

BY Edward Dugas
ATTORNEY

Dec. 15, 1970   J. B. GARDNER   3,548,211
ROTATING RADIATION SENSOR
Filed Feb. 27, 1968   3 Sheets-Sheet 2

James B. Gardner
INVENTOR.

BY *Edward Dugas*
ATTORNEY

United States Patent Office 3,548,211
Patented Dec. 15, 1970

3,548,211
ROTATING RADIATION SENSOR
James B. Gardner, Redondo Beach, Calif., assignor to TRW Inc., Redondo Beach, Calif., a corporation of Ohio
Filed Feb. 27, 1968, Ser. No. 708,700
Int. Cl. G01j *1/20;* H01j *39/12*
U.S. Cl. 250—203  10 Claims

ABSTRACT OF THE DISCLOSURE

In one embodiment of this invention, a spacecraft partially shaped as a hemisphere is designed to rotate about a spin axis which passes through the center of the hemisphere is designed to rotate about a spin axis which passes through the center of the hemisphere. An aperture is cut into the hemisphere, with the aperture being defined by the intersection of a circular cylinder having a diameter which is equal to the radius of the hemisphere positioned with the central axis of the circular cylinder parallel to the spin axis of the spacecraft and intersecting a line perpendicular to the spin axis at a point equal to one-half the radius of the hemisphere from the center of the hemisphere. A radiation sensor is positioned in this so defined aperture opening at the center of the hemisphere. Electronic means are affixed to the sensor to provide an indication of the time that a beam of electromagnetic radiation is present on the hemisphere center through the apertured opening. The length of time that the radiation beam is impingent upon the radiation sensor is then directly proportional to the complement of the angle between the spin axis of the sphere and the axis of the beam of radiation.

BACKGROUND OF THE INVENTION

This invention pertains to the field of radiation sensors for determining the attitude angle of a rotating body with respect to an electromagnetic radiation source such as a light source and, more particularly, to a device which provides an output which is proportional to the complement of the angle between the spin axis of a spacecraft and the sun.

In the space vehicle art, many devices have been utilized for determining attitude. Sun sensors, in particular, have experienced a fair degree of success in this application. The sun sensors presently in use require an optical system for focusing the rays of the sun onto a photodetector, which in turn provides an output signal indicative of the position of the image of the sun upon the face of the photodetector material.

Most sun sensor systems used for determining the attitude of the space vehicle are quite complex and require considerable data handling capacity, volume, weight and cost.

One prior art spacecraft attitude detector is disclosed in U.S. patent application Ser. No. 607,409, entitled "Spacecraft Attitude Detector" by Franklin G. Kelly et al., filed Jan. 5, 1967 and assigned to TRW Systems Group, the assignee of the present invention. In that application, there is disclosed a device for determining the attitude of an object such as a space vehicle relative to a beam of electromagnetic radiation by affixing a plurality of electromagnetic radiation sensors angularly displaced about an axis of the object such that less than all of the radiation sensors will be in the path of the beam at any one point in time. The output of the radiation sensors indicates which sensors are being radiated by the beam, thereby providing a relative indication of the attitude of the object's axis with respect to the beam.

Another device of interest is disclosed in U.S. Pat. No. 3,180,587 entitled, "Attitude Orientation of Spin-Stabilized Space Vehicles," by H. D. Garner et al., in which a radiation sensitive detecting element is mounted on the focal point of a telescope. The vehicle being spin-stabilized, the telescope and detecting element, together constitute a scanning device which, during each rotation of the vehicle, sweeps or traverses the surface of an imaginary spatial cone. The angle between the axis of the vehicle and the axis of the telescope is selected so that at the attitude at which the system will function, the apex angle of the imaginary spatial cone is such that the surface thereof will be generally tangential to a reference body such as a planet, but slightly spaced from the local horizon thereof. The device is still arranged so that whenever the line of sight of the telescope intersects the horizon of a planet, an electrical signal actuates a gas discharge from a nozzle to reorient the spacecraft in an attitude which is perpendicular to the local horizon. The device of that patent does not provide an output which is indicative of the angular position of a planet or other source of collimated radiation energy with respect to the spin axis of the spacecraft.

Another prior device is disclosed in U.S. Pat. No. 3,294,344 entitled, "Changing the Orientation and Velocity of a Spinning Body Traversing a Path" by H. A. Rosen et al., in which a spin-stabilized satellite has mounted therein a set of photodetectors which receive the sun's image through slits positioned on opposite sides of the spacecraft and which slits are perpendicular to each other such that each slit view a thin, fan-like field of view. The output of these photodetectors control a set of small thruster engines on the satellite which in turn controls the orientation of the spin axis of the satellite with respect to the position of the sun, as viewed through the slits. In this particular device, the orientation of the sun if it is not within the field of view of the slit is not known, nor is the attitude of the sun with respect to the spin axis known with any degree of accuracy when the sun is within the sensor's field of view.

SUMMARY OF THE INVENTION

In a preferred embodiment of the invention, a spin-stabilized spacecraft is formed with a section shaped as a sphere portion. The sphere portion is provided with an aperture opening, the aperture having a shape defined by the intersection of a circular cylinder with the surface of the sphere such that the axis defining the circular cylinder is parallel to the spin axis of the spacecraft and displaced from the center of the sphere by one-half the radius of the sphere, and wherein the diameter of the cylinder is equal to the radius of the sphere with the center of the sphere being tangential to the outer surface of the cylinder. Electromagnetic radiation sensing means are positioned at the sphere's center with electronic means coupled thereto for providing an output indicative of the impingement of electromagnetic radiation upon the surface of the sensing means. With the shape of the apertured opening so defined, a source of electromagnetic radiation will trace an arc across the opening of the aperture, which in turn illuminates the radiation sensing means for a period of time that is directly proportional to the complement of the angle between the electromagnetic radiation source and the spin axis of the space vehicle.

In a second embodiment of the invention, one such apertured opening and radiation means is provided for one hemisphere of the total sphere and another is provided for the other hemisphere, the output of each sensing means being sent to an electronic means which provides an output which is not only an indication of the presence and angle of impinging radiation upon the sensing means, but also an output indicative of which sensing means is receiving the radiation.

Accordingly, it is an object of the present invention to provide an improved spacecraft attitude detector.

It is a further object of the present invention to provide an attitude detector which is highly accurate, yet which utilizes a minimum number of parts.

It is another object of the present invention to provide an attitude detector wherein the output is directly proportional to the complement of the angle between the electromagnetic radiation source and the spin axis of the vehicle.

The aforementioned and other object of the present invention will become more apparent when taken in conjunction with the following description and drawings, throughout which like characters indicate like parts, and which drawings form a part of this application.

BRIEF DESCRIPTION OF THE EMBODIMENT

Figure 1:
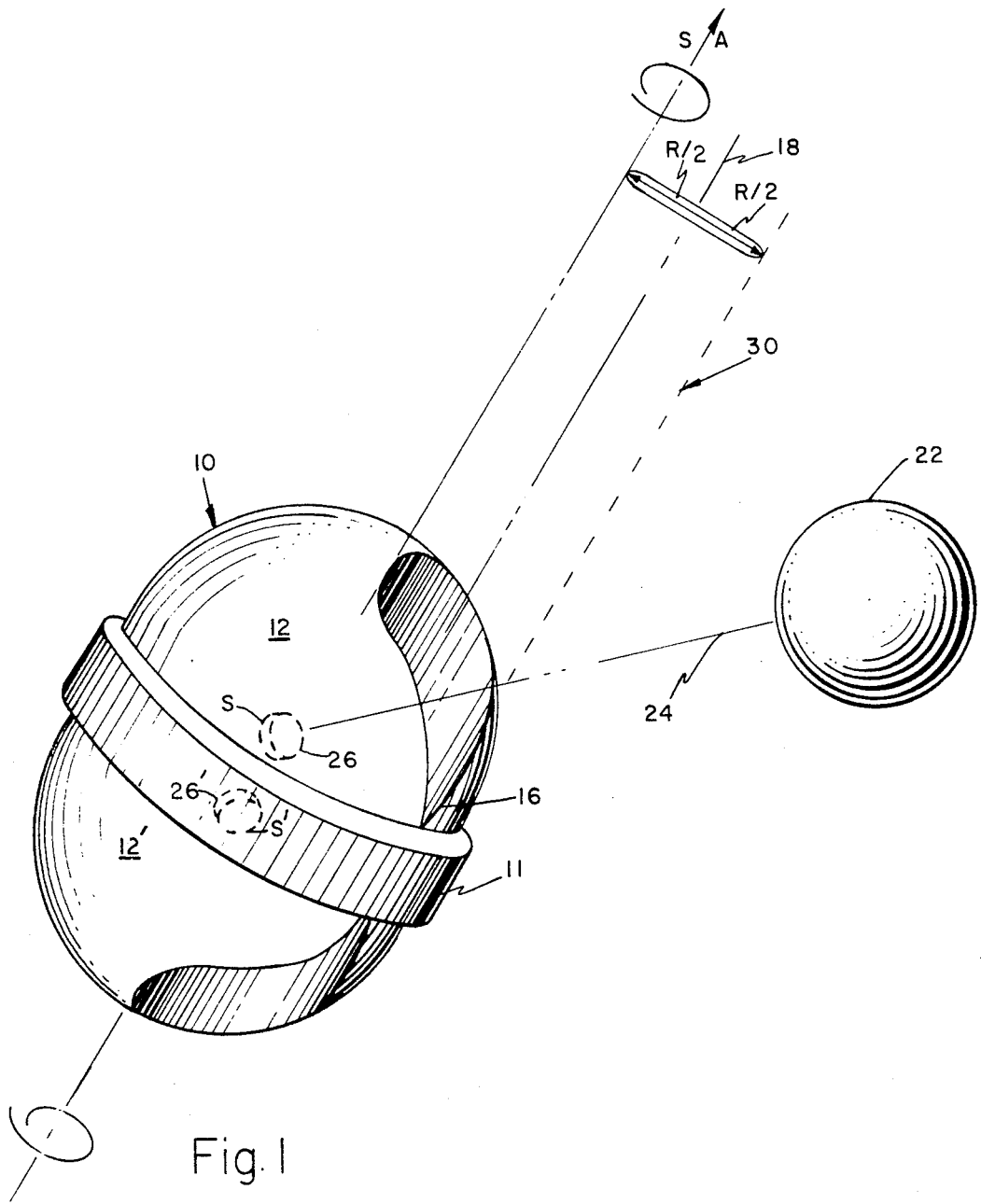
FIG. 1 is a perspective view of the preferred embodiment of the invention.

Referring to FIG. 1, the spacecraft 10 is shown shaped in the form of a sphere having an upper hemisphere 12 and lower hemisphere 12'. The hemispheres are separated by a band 11. In the embodiment shown in FIG. 1, there is perfect symmetry between the upper and lower hemispheres; therefore, only the upper hemishere components will be discussed with the corresponding lower hemisphere components being designated with a ('). The spin axis of the space vehicle is designated SA. The source of electromagnetic radiation, which may be the sun, is designated 22, and it provides a substantially collimated beam of electromagnetic radiation projecting to the spacecraft 10 along an axis 24. The angle between the electromagnetic radiation beam 24 and a normal to the spacecraft spin axis is designated $\theta$. The spin axis SA passes through the center 26 of the upper hemisphere 12. The radius of the hemisphere is designated R. An apertured opening 16 is formed in the upper hemisphere 12 of the spacecraft with the shape being that of a circular cylinder 30 outlined in dotted lines and having a radius equivalent to $R/2$. The central longitudinal axis of the right circular cylinder is designated 18 and is positioned parallel to the spin axis SA and is located a distance $R/2$ from the center of the hemisphere. Positioned in the aperture at the center of the hemisphere is an electromagnetic radiation sensor S. The center of the hemisphere 12, for example, is defined as the center of the sphere generated by the rotation of a circle with the radius R about its diameter, which will also define the hemisphere 12. The radius of the hemisphere 12 is defined as this radius R. Because two radiation sensors cannot occupy the same space at the center of the sphere, the sphere can be split with the centers 26 and 26' displaced apart a short distance. The band 11 provides this separation. The second radiation sensor S' can now be placed at the center 26' of the lower hemisphere 12' to provide the spacecraft with a sensor that will detect the polarity and angle of the spin axis with respect to the axis of the radiation beam 24.

Figure 2:
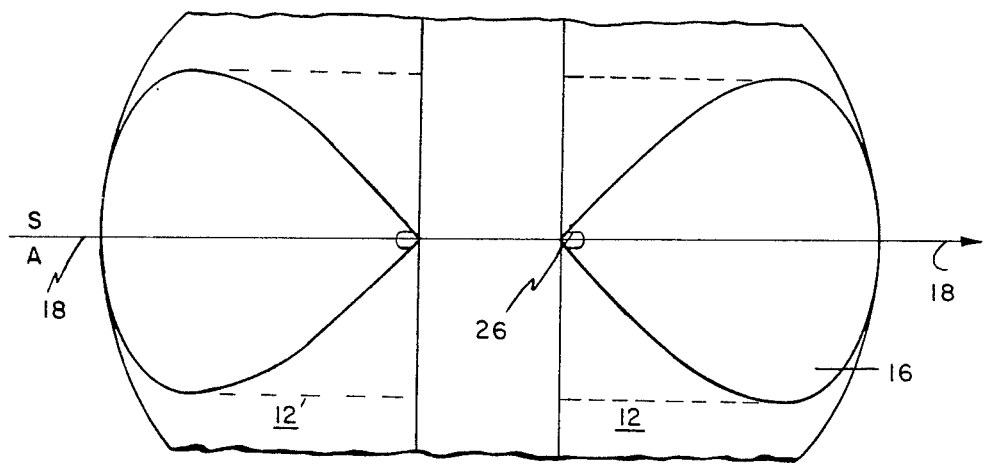
FIG. 2 illustrates a top view of the embodiment shown in FIG. 1.

Referring to FIG. 2, the apertured openings 16 and 16' from the front of the hemispheres 12 and 12' trace out teardrop openings, with the plane of the imaginary central axis of the intersecting circular cylinder 18 passing through the apex point of the teardrop.

Figure 3:
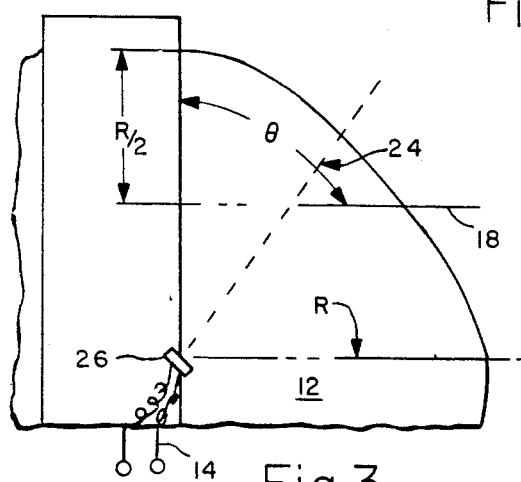
FIG. 3 illustrates a side view of the upper hemisphere of the embodiment shown in FIG. 1.

FIG. 3 is a side view of the upper hemisphere 12 of FIG. 1, illustrating the positioning of the radiation sensor S at the center 26 of the hemisphere. The output of the radiation sensor is present at the ends of electrical leads 14.

Figure 4:
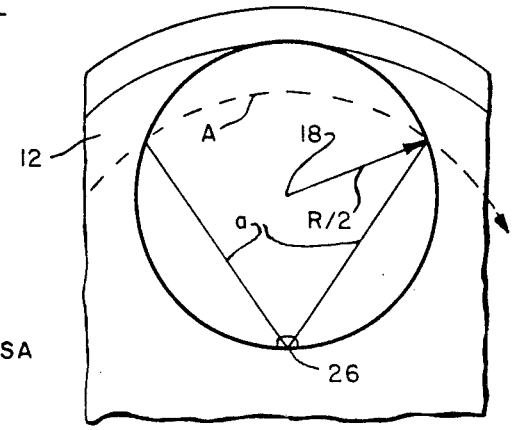
FIG. 4 illustrates an end view of the embodiment shown in FIG. 1.

Referring now to FIG. 4, which is a top view of the apertured opening 16 taken along the cylinder axis 18. In this view, the defined apertured opening can be seen to be a perfect circle having a radius $R/2$ with the center of the circle positioned a distance $R/2$ from the center of the hemisphere 26. With the spacecraft 10 rotating about its spin axis SA, the beam of radiation directed along the axis 24 will trace out a circle of radius "$a$" on the surface of the sphere. This circle of radius "$a$" is then equal to the cosine of the angle $\theta$; that is $a=\cos\theta$. With the aperture 16 cut into the hemisphere in this particular manner, the duration of time that the radiant energy beam along axis 24 is visible to the center of the sphere will be proportional to the arc A of the circle of radius "$a$" that lies within the aperture. Setting the arc A proportional to $\theta$, with the constant of proportionality $$\theta = \frac{A}{2}$$

the locus of the end point of these arcs, centered on the meridian of the unit sphere of radius R, is a circle of radius $R/2$. Then, if $a=R\cos\theta=2(R/2)\cos(A/2)$, we then have $\theta=A/2$. This means that if the spherical object is bored with a hole of one-half the sphere diameter with the hole tangent internally to the sphere center, the proper aperture shape will be generated. With the radiation sensor placed at the sphere center, the rotation of the aperture about the axis of the cylinder will cause an electrical signal to be generated the duration of which is proportional to the angle $\theta$. Specifically, if T is the spin period, and "$t$" is the signal width, then $\theta=(t/T)\,180°$. In those particular applications wherein the spin axis of the spacecraft is automatically maintained within a certain range, such that the source of electromagnetic radiation always traces out a circle in the upper hemisphere, then it is no longer necessary to provide a similar sensor arrangement for the lower hemisphere. But in those applications wherein the spin axis takes a random orientation towards the source of electromagnetic radiation and wherein the beam of radiation may trace a path either above or below the equatorial plane of the sphere, it may be advantageous to have an indication of the polarity of the spin axis with respect to the beam of radiation. The entire spacecraft 10 need not be shaped as a sphere. It is only necessary that the boundary of the aperture have the shape defined by the tangential intersection of a spherical surface of radius R and cylindrical surface of diameter R. It is only necessary that the area surrounding the aperture 16 be shaped as a sphere.

Figure 5:
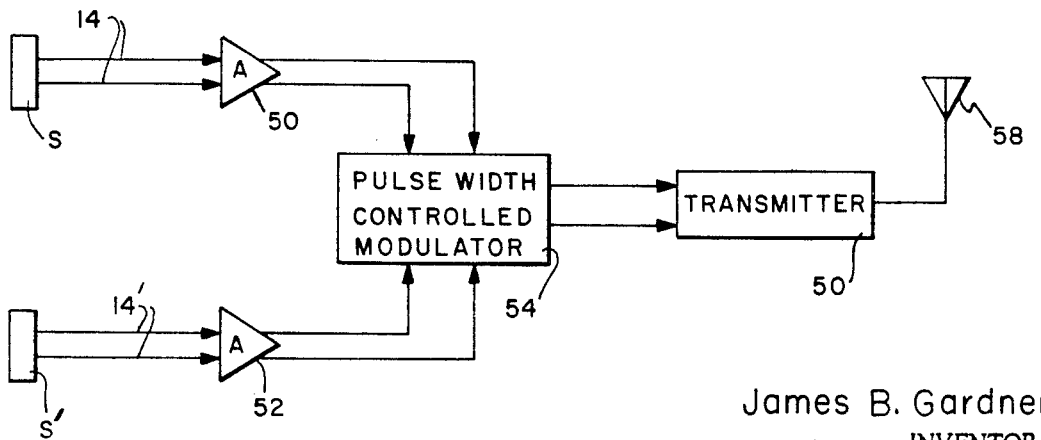
FIG. 5 illustrates in block diagram form an electrical circuit which may be used with the present invention.

Referring now to FIG. 5 wherein is shown the electronics for a spacecraft having a sensor both in the upper and lower hemisphere. For the case with a detector in only one of the hemispheres, either detector S and its associated electronics, or S', can be left off. The output from the photodetector S is directed along leads 14 to an operational amplifier 50. The output of the amplifier 50 is fed to a pulse width controlled modulator 54, which provides a modulation signal proportional to the width of the pulse received from the sensor S'. Sensor S' sends its output along leads 14' to the input of an inverting operational amplifier 52, the output of which is also fed to the pulse width controlled modulator 54. The output of the modulator 54 is a signal that is indicative of the duration of the pulses received at the sensors, and which also has polarity information identifying which sensor is being illuminated. The output of modulator 54 is fed to a transmitter 56 and from there to an antenna 58 for transmittal to a ground based station.

Figure 6:
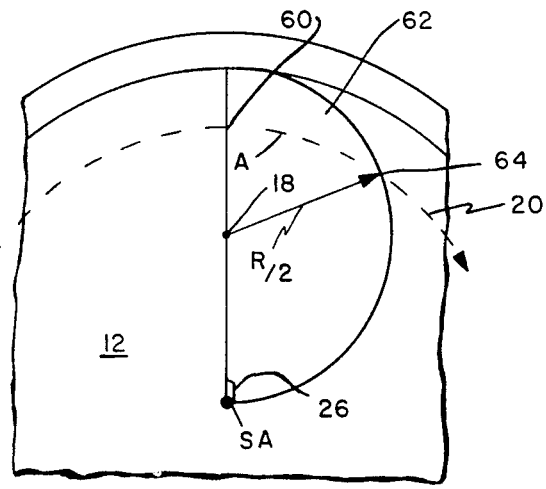
FIG. 6 illustrates a second embodiment of the invention.

Referring to FIG. 6, wherein a second embodiment is illustrated, having one-half of an opening 62. The other half of the opening is covered creating a leading edge 60. A beam of radiation passing along the path 20 will be visible to the electromagnetic sensor 26 for a period of time corresponding to the distance between the leading edge 60 and the rim 64 of the apertured opening 62. The particular advantage achieved by this embodiment is the fact that the leading edge 60 causes a pulse (either leading edge or trailing edge) which remains fixed in time regardless of the attitude angle of the spacecraft 10 with respect to electromagnetic source 22.

Figure 7:
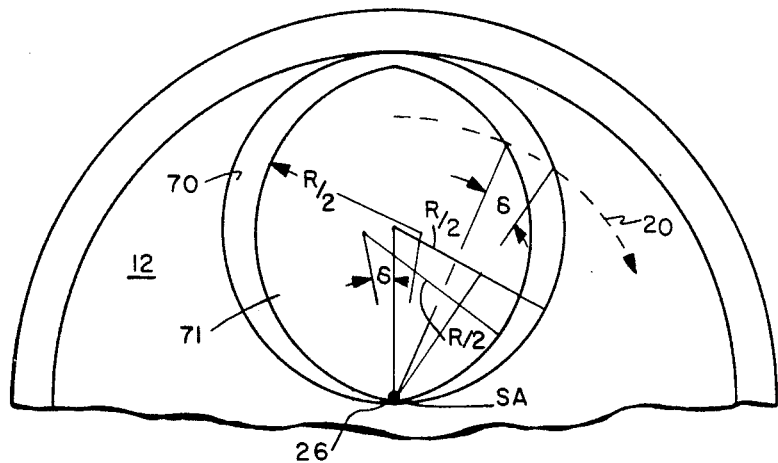
FIG. 7 Ilustrates a third embodiment of the invention.

Referring now to FIG. 7; a third embodiment is illustrated with the apertured opening 16 partially covered by a symmetrical shield 71. On certain missions the level of radiation received at the electromagnetic sensor 26 would be too great causing the sensor to either burn out or to provide an output signal continuously. On these particular missions a shield can be inserted over a portion of the opening cutting down the level of radiation received. The width of the spacing between the shield and the walls of the apertured opening designated δ should be such that the width of the pulses received at the electromagnetic sensor 26 is still proportional to the angle θ. The spacing δ can be maintained by displacing the centers of each half the arcs forming the shield shape on arc distance δ from the center of the cylindrical opening 18, as shown. The ooutput from the electromagnetic sensor 26 will then be a pair of pulses having a separation proportional to the angle θ.

To summarize, the device is designed to determine the angle between an axis of rotation of a spacecraft and a source of electromagnetic radiation such as the sun. The device utilizes an aperture shape which has the characteristic that if rotated about the spin axis and illuminated by a beam of radiation, the time that the center point of the device is illuminated by the beam of radiation is proportional to the angle between the beam and the equatorial plane of the device. The aperture shape is defined by the curve generation with the intersection of a spherical surface and a cylinder. The diameter of the cylinder is made equal to the radius of the sphere with the center of the sphere being tangential to a point on the outer surface of the cylinder.

While there has been shown what is considered to be the preferred embodiment of the present invention, it will be manifest that many changes and modifications may be made therein, without departing from the essential spirit of the invention. It is intended, therefore, in the annexed claims, to cover all such changes and modifications as may fall within the true scope of the invention.

What is claimed is:

1. An attitude detector for detecting the angle between the axis of a rotating body and a collimated light source comprising in combination:
   a rotating body having a section thereof shaped as a sphere, the center of which is located on the axis of rotation of said rotating body;
   an aperture opening defined by said sphere section, said aperture being formed by the intersection of a cylinder having a diameter equal to the radius of said sphere, with the longitudinal axis of said cylinder positioned parallel to the rotating axis of said body,
   and with the outer surface of said cylinder being tangential to the center of said sphere;
   radiation sensor means positioned in said aperture at the center of said sphere; and
   means for detecting the output of said radiation sensor means, wherein said output is proportional to the angle between the axis of rotation of said body and said collimated light source.

2. The invention according to claim 1 wherein one-half of said apertured opening is covered.

3. The invention according to claim 1 and further comprising a shield symmetrically positioned in said apertured opening to decrease the total radiation received by said radiation sensor means.

4. In combination:
   a hemisphere, said hemisphere having an axis of symmetry about which it is rotated;
   an aperture in said hemisphere, said aperture being defined by the curve formed when a cylinder having a diameter equal to the radius of said hemisphere intersects said hemisphere with the longitudinal axis of said cylinder positioned parallel to and displaced from said axis of symmetry a distance of one-half the radius of said hemisphere;
   radiation sensing means positioned in said aperture at the center of said hemisphere; and
   means responsive to said radiation sensing means providing an indication of said sensed radiation.

5. The invention according to claim 4 and further comprising a second hemisphere connected to said first named hemisphere to form a sphere;
   an apertured opening in said second hemisphere being defined in a manner identical with said first-named aperature; and
   a second radiation sensing means positioned in said second defined aperture at the center of said second hemisphere.

6. The invention according to claim 4 wherein one-half of said apertured opening is covered.

7. The invention according to claim 4 and further comprising a shield symmetrically positioned in said apertured opening to decrease the total radiation received by said radiation sensor means.

8. An attitude detector for detecting the angle between a rotating body and a beam of electromagnetic radiation comprising in combination:
   a rotating body formed in part with the shape of a sphere, said sphere portion having its center along the axis of rotation of said body;
   an apertured opening in said sphere portion projecting to the center of said sphere, said opening being defined by the intersection of a circular cylinder having a diameter which is equal to the radius of said sphere positioned with the axis of said cylinder parallel to said rotational axis and displaced from said rotational axis a distance equal to one-half the radius of said sphere; and
   sensing means positioned in said defined aperture for determining the time required for said beam of electromagnetic raidation to travel across said defined aperture.

9. An attitude detector for detecting the angle between a rotating body and a beam of radiation, said detector comprising:
   (a) a body rotating about a rotational axis, said body having at least a portion of sphereical shape;
   (b) an apertured opening within the sphereical portion of said body, said apertured opening being defined by the intersection of a cylinder with said portion of sphereical shape, said cylinder having a diameter equal to the radius of the sphere defined by said portion of sphereical shape, the longitudinal axis of said cylinder being substantially parallel to said rotational axis, whereby the time required for said beam of radiation to travel across said aperture is proportional to the angle between a plane perpendicular to said rotational axis and said beam; and (c) means disposed in said defined opening for determining the time said beam requires to travel across said aperture.

10. The invention according to claim 9 wherein said means for determining the time is comprised of a radiation sensing means positioned in said defined opening at said rotational axis; and means connected to said radiation sensing means, providing an output indicative of said sensed radiation.

References Cited

UNITED STATES PATENTS 3,350,562  10/1967  Flint _____ 250—233X

JAMES W. LAWRENCE, Primary Examiner

C. R. CAMPBELL, Assistant Examiner

U.S. Cl. X.R.

244—1; 250—209, 233, 237, 239